(12) United States Patent
DeFelice et al.

(10) Patent No.: US 11,312,069 B2
(45) Date of Patent: Apr. 26, 2022

(54) SYSTEM FOR SELECTIVE LASER SINTERING

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 224 days.

(21) Appl. No.: 16/604,934

(22) PCT Filed: Apr. 25, 2018

(86) PCT No.: PCT/US2018/029292
§ 371 (c)(1),
(2) Date: Oct. 11, 2019

(87) PCT Pub. No.: WO2018/200628
PCT Pub. Date: Nov. 1, 2018

(65) Prior Publication Data
US 2020/0376750 A1 Dec. 3, 2020

Related U.S. Application Data

(60) Provisional application No. 62/489,780, filed on Apr. 25, 2017.

(51) Int. Cl.
*B29C 64/153* (2017.01)
*B33Y 30/00* (2015.01)
(Continued)

(52) U.S. Cl.
CPC .......... *B29C 64/153* (2017.08); *B29C 64/268* (2017.08); *B29C 64/295* (2017.08);
(Continued)

(58) Field of Classification Search
CPC ... B29C 64/153; B29C 64/295; B29C 64/393; B29C 64/268; B33Y 30/00; B33Y 50/02
See application file for complete search history.

(56) References Cited

U.S. PATENT DOCUMENTS 5,427,733 A 6/1995 Benda et al.
6,930,278 B1 8/2005 Chung et al.
(Continued)

FOREIGN PATENT DOCUMENTS

WO 2016202753 A1 12/2016

OTHER PUBLICATIONS

Supplementary European Search Report in EP 18791345 dated Feb. 19, 2021 p. 8.
(Continued)

*Primary Examiner* — Joseph S Del Sole
*Assistant Examiner* — John Robitaille
(74) *Attorney, Agent, or Firm* — Welsh IP Law LLC

(57) ABSTRACT

A system for producing an object from a powder by selective laser sintering. The system includes a chamber and a support platform in the chamber. A spreader applies a layer of powder to a bed surface. An irradiation source irradiates select points in the powdered layer prepared on the support platform. A radiant heater heats at least a portion of the bed surface. A temperature sensor monitors the temperature of select points on the bed surface. A controller adjusts the radiant heater in response to temperature data provided by the temperature sensor.

20 Claims, 5 Drawing Sheets

(51) Int. Cl.
*B33Y 50/02* (2015.01)
*B29C 64/295* (2017.01)
*B29C 64/393* (2017.01)
*B29C 64/268* (2017.01)
*B29K 71/00* (2006.01)

(52) U.S. Cl.
CPC ............ *B29C 64/393* (2017.08); *B33Y 30/00* (2014.12); *B33Y 50/02* (2014.12); *B29K 2071/00* (2013.01)

(56) References Cited

U.S. PATENT DOCUMENTS

| | | | |
|---|---|---|---|
| 8,137,739 | B2 | 3/2012 | Philippi et al. |
| 2004/0200816 | A1 | 10/2004 | Chung et al. |
| 2004/0251242 | A1* | 12/2004 | Suh .................. B23K 26/32 219/121.63 |
| 2007/0196561 | A1* | 8/2007 | Philippi ................ B33Y 30/00 427/8 |
| 2007/0298182 | A1 | 12/2007 | Perret et al. |
| 2016/0271884 | A1 | 9/2016 | Herzog |
| 2016/0332384 | A1 | 11/2016 | Manual et al. |
| 2017/0072643 | A1 | 3/2017 | Ng et al. |
| 2019/0047226 | A1* | 2/2019 | Ishikawa ................ B22F 10/30 |

OTHER PUBLICATIONS

IRI 2002 Multipoint Radiometer (IRISYS), published Dec. 2004, Issue 2, IPU 40049 1 Page.
PCT International Search Report & Written Opinion Application No. PCT/US2018/029292 Completed: Jul. 3, 2018; dated Jul. 20, 2018 11 Pages.

\* cited by examiner

SYSTEM FOR SELECTIVE LASER SINTERING

TECHNICAL FIELD

The present disclosure generally relates to an additive manufacturing system and methods of using the same, and more particularly relates to an additive manufacturing system that provides improved process control through enhanced bed temperature monitoring.

BACKGROUND

Selective laser sintering ("LS") is a layer-wise additive manufacturing technique in which electromagnetic radiation, for example from a $CO_2$ laser, is used to bind a powder building material at select points to create a solid structure having a desired three-dimensional shape. The building material may include plastic, metal (direct metal laser sintering), ceramic, or glass powders. In some techniques, for example techniques for use with metals, a technique referred to as selective laser melting ("LM") is used in which the powder is melted as opposed to sintered.

Typically, a CAD model of an object to be constructed by LS is prepared using known software applications. The CAD model is sectioned into layers to create build data for the object. The build data comprises a plurality of cross-section patterns according to the CAD model. For each layer the LS building process is as follows: a layer of a building material is disposed on a bed of a laser sintering system. The applied layer is scanned and solidified at select points by a source of controlled electromagnetic radiation in accordance with the cross-section pattern associated with that layer. After a cross-section is scanned causing solidification at select points, the bed is lowered by one layer thickness, a new layer of powdered material is disposed on the bed, and the bed is rescanned by the laser. This process is repeated until the build is completed.

Prior to scanning, an LS machine may preheat the powder material disposed on the bed to a temperature proximate to a melting point of the powder. Preheating is typically accomplished by one or more radiant heaters disposed above the bed surface and/or by resistant heaters in the bed or the frame. Preheating the powder makes it easier for the laser to raise the temperature of powder to a fusing point.

A disadvantage of known LS systems is that they provided limited temperature control of the bed surface leading to nonlinear shrinkage and nonlinear strength in manufactured parts.

Accordingly, there is need for an improved system for the manufacture of an object by LS.

SUMMARY

The present invention resides in one aspect in a system for selective laser sintering. The system includes a housing defining a chamber. A support platform is disposed in the chamber and moveable therein along an axis for supporting one or more layers of a powder and any part formed therein. The system further includes a spreader for applying a layer of powder to a bed surface. The bed surface is defined by an upper surface of the support platform or an upper surface of the powdered layer prepared most recently on the support platform. The system further includes an irradiation source for irradiating select points in the powdered layer prepared most recently on the support platform. The system further includes a radiant heater disposed in the chamber and configured to heat at least a portion of the bed surface. The system further includes a temperature sensor disposed in the chamber and configured to monitor a temperature at a select point on the bed surface. The temperature sensor is connected to a mount disposed in the chamber. The mount is biasable between a first configuration and a second configuration. In the first configuration, the mount is locked and the position of the temperature sensor relative to the bed surface is fixed. In the second configuration, the mount is unlocked and the position of the temperature sensor relative to the bed surface is unfixed. The system further includes a controller for adjusting the radiant heater in response to temperature data provided by the temperature sensor. The biasable mount enables an operator to adjust and set a position of the temperature sensor so that it can monitor a select point of the bed surface desired by the operator.

In yet another embodiment of the present invention, the temperature sensor is a pyrometer.

In yet another embodiment of the present invention, the mount is translatable along a first axis in the chamber. The first axis is parallel to the bed surface. The mount is translatable along a second axis perpendicular to the first axis. The mount is rotatable about a first axis and a second axis of rotation.

In some embodiments of the present invention, the mount is spherically mounted to rotate along the first and second axis and rotate along the first and second axis of rotation.

In some embodiments of the present invention, the mount is positioned outside a perimeter of the bed surface.

The present invention resides in another aspect in a system for producing an object from a powder. The system comprising a housing defining a chamber. A support platform disposed in the chamber and moveable therein along an axis for supporting one or more layers of a powder and any part formed therein. The system further includes a spreader for applying a layer of powder to a bed surface. The bed surface is defined by an upper surface of the support platform or an upper surface of the powdered layer prepared most recently on the support platform. The system further includes an irradiation source for irradiating select points in the powdered layer prepared most recently on the support platform. The system further includes a radiant heater disposed in the chamber and configured to heat at least a portion of the bed surface. The system further includes a temperature sensor disposed in the chamber and configured to monitor the temperature of a plurality of positions on the bed surface during a build process. The system further includes a controller for adjusting the radiant heater in response to temperature data provided by the temperature sensor.

In some embodiments of the present invention, the radiant heater is comprised of a plurality of radiant heaters wherein each individual radiant heater heats a specific portion of the bed surface.

In some embodiments of the present invention, the temperature sensor is a pyrometer which is connected to a scanner which scans the bed surface to determine temperature at different areas.

In some embodiments of the present invention, there are multiple temperature sensors to measure multiple spots on the bed surface during a build run.

DETAILED DESCRIPTION

Figure 1:
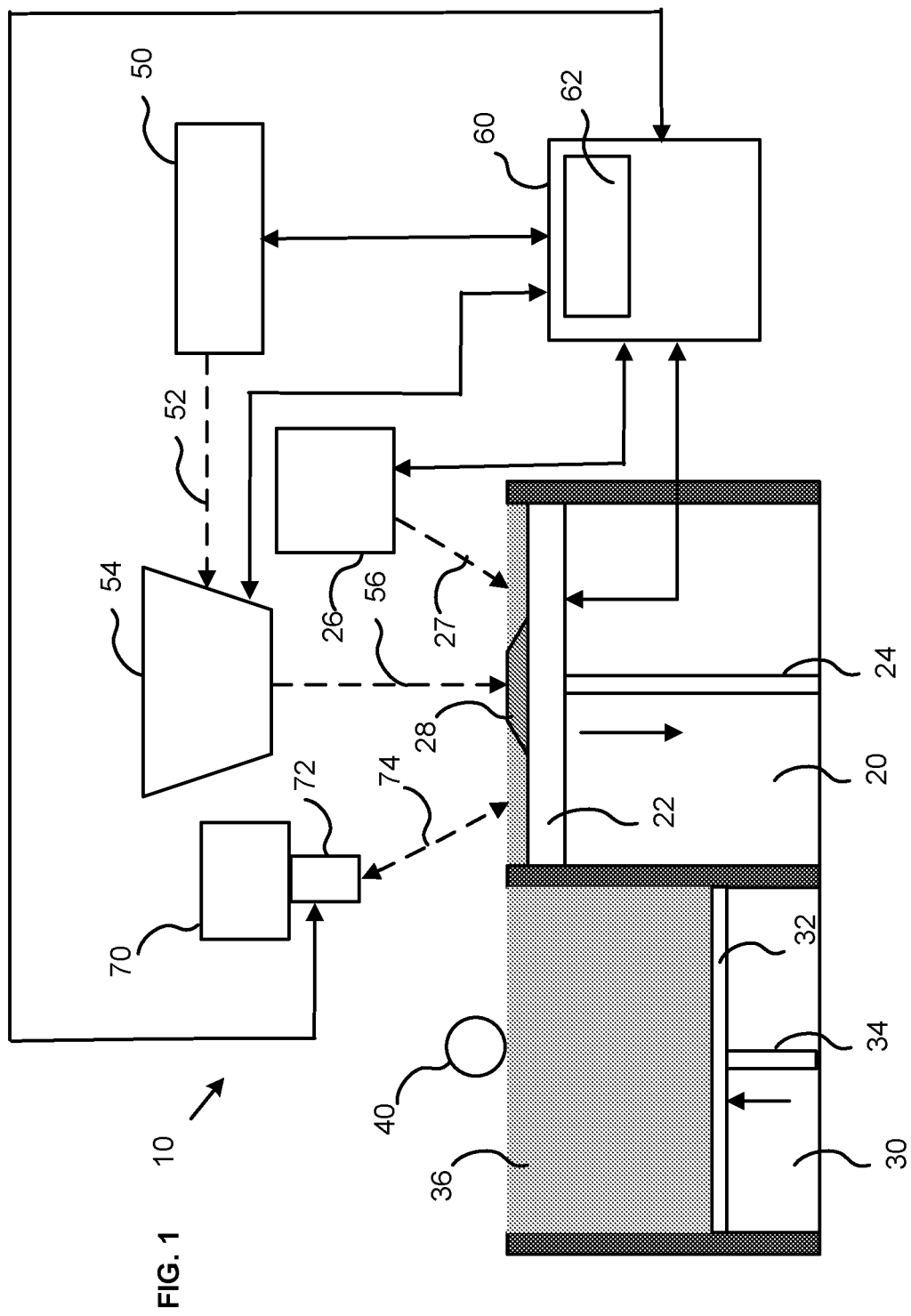
FIG. 1 illustrates an LS machine in accordance with one embodiment of the present invention.

The present disclosure describes aspects of the present invention with reference to the exemplary embodiments illustrated in the drawings. However, aspects of the present invention are not limited to the exemplary embodiments illustrated in the drawings. It will be apparent to those of ordinary skill in the art that aspects of the present invention include many more embodiments.

In reference to FIG. 1, an LS system 10 in accordance with one embodiment of the present invention is illustrated. The system 10 includes a first chamber 20 having an actuatable piston 24 disposed therein. A bed 22 is disposed at an end of the piston 24. It should be understood that the term bed may refer to the physical structure supported on the piston or the uppermost layer of powder disposed thereon.

The temperature of the bed 22 can be variably controlled via a controller 60 in communication with one or more heating elements in and or around the bed 22. Furthermore, the LS system 10 according to the invention includes a heating device 26 above the bed 22, which preheats a newly applied powder layer up to a working temperature below a temperature at which the solidification of the powder material occurs. The heating device 26 may be a radiative heating device (e.g., one or more radiant heaters) which can introduce heat energy into the newly applied powder layer in a large area by emitting electromagnetic radiation and is in communication with controller 60. It will be understood to a person of ordinary skill in the art and familiar with this disclosure that multiple radiative heating units may be used.

A second chamber 30 is adjacent to the first chamber 20. The second chamber 30 includes a table surface 32 disposed on an end of a piston 34 disposed therein. A powder 36 for use in the LS system 10 is stored in the second chamber 30 prior to the sintering step. It will be understood to a person of ordinary skill in the art and familiar with this disclosure that while a specific embodiment of an LS system is disclosed, the present invention is not limited and different known LS systems may be employed in the practice of the present invention.

During operation of the LS system 10, a spreader 40 translates across a top surface of the first chamber 20, evenly distributing a layer of powder 36 across either the top surface of the bed 22, or the material previously disposed on the bed 22. The LS system 10 preheats the powder material 36 disposed on the bed 22 to a temperature proximate to a melting point of the powder. A bed temperature set point is entered in to the controller and software executing on the controller adjusts the power to one or more of the radiant heaters to maintain the bed temperature at or near the temperature set point. Typically, a layer of powder is spread to have a thickness of 125 μm, however the thickness of the layer of powder can be increased or decreased depending on the specific LS process and within the limits of the LS system.

A laser 50 and a scanning device 54 are disposed above the bed 22. The laser 50 transmits a beam 52 to the scanner 54, which then distributes a laser beam 56 across the layer of powder 36 disposed on the bed 22 in accordance with a build data. The laser selectively fuses powdered material by scanning cross-sections generated from a three-dimensional digital description of the part on the surface of the bed having a layer of the powdered material disposed thereon. The laser 50 and the scanner 54 are in communication with the controller 60. After a cross-section is scanned, the bed 22 is lowered by one layer thickness (illustrated by the downward arrow), a new layer of powdered material is disposed on the bed 22 via the spreader 40, and the bed 22 is rescanned by the laser. This process is repeated until a build 28 is completed. During this build process, the piston 34 in the second chamber is incrementally raised (illustrated by the upward arrow) to ensure that there is a sufficient supply of powder 36.

In further reference to FIG. 1, a mount 70 is disposed above the bed 22 in the chamber 20. A temperature sensor 72 is coupled to the mount 70. The temperature sensor 72 is configured to detect the temperature of a point on the bed surface 22. The temperature sensor 72 reflects a beam 74 off the bed surface 22 and relays it back to the controller 60 to monitor a temperature at a select point on the bed 22. The temperature sensor 72 is in communication with the controller 60. Software executing on the controller 60, adjusts the power to the heater 26 based on the measured temperature from the temperature sensor 72. This maintains the bed temperature at the preselected temperature throughout a build process.

The temperature sensor 72 is connected to a mount 70. The mount 70 is biasable between a first locked configuration and a second unlocked configuration. In the first locked configuration the mount 70 is fixed to so that the position of the temperature sensor 72 is fixed relative to the bed surface 22. In the first configuration, the temperature sensor 72 measures the temperature of a selection location on the bed surface 22 during a build process. In the second unlocked configuration the mount 70 is adjustable relative to the bed surface 22, thereby allowing an operator to adjust the position of the temperature sensor 72 in between runs.

For example, because the operator cannot open the chamber 20 during a build run because of the extreme heat and lack of oxygen, the position of the temperature sensor 72 needs to be adjusted before the build run begins. To do this the operator would place the mount 70 in the second unlocked configuration to adjust the position of the temperature sensor 72. The operator can then adjust the mount 70 so that the temperature sensor monitors the temperature of a desired select point on the bed surface 22. Once the operator positions the temperature sensor 72 for the build run by adjusting the mount 70, the operator places the mount 70 in the first locked configuration thereby fixing the position of the mount 70 and the temperature sensor 72 during the build process. The temperature sensor 72 measures the temperature of the select point on the bed surface 22. The operator may position the temperature sensor 72 to monitor the temperature at a desired location on the bed surface 22 during the build process. For example, the operator may prefer to measure a temperature proximate to an edge of the bed surface 22, or to monitor the temperature proximate to a center of the bed surface 22, or to monitor the temperature proximate to a key feature of an object being built in the bed 22. In yet other embodiments of the present invention, the position of the mount is adjusted to ensure that the irradiation device 50 and scanner 54 in optic communication therewith has sufficient clearance to irradiate select portions of the powdered bed in accordance with the build instructions.

Figure 2:
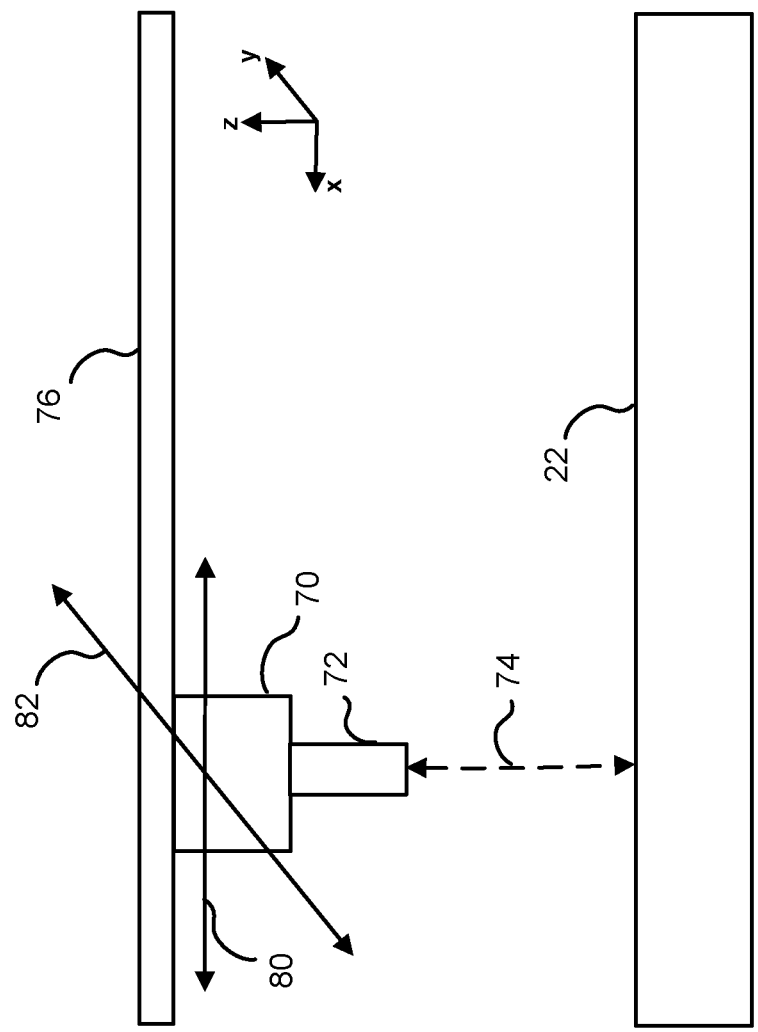
FIG. 2 is a schematic view of a mount and temperature sensor in accordance with one embodiment of the present invention.

In reference to FIG. 2, the mount 70 and temperature sensor 72 are disposed above the bed 22. The temperature sensor 72 reflects a beam 74 to monitor a temperature at a select point on the bed 22. The temperature sensor 72 is connected to the mount 70.

In one embodiment of the present invention, the position of the mount relative the bed surface can be translated along a first axis 80 and along a second axis 82. The first and second axes 80 and 82 are parallel to the bed surface 22. For example, in one embodiment the mount 70 is coupled to a track 76, which allows the mount 70 to move along the first axis 80 parallel to the bed 22. In the second unlocked configuration, the mount 70 is translatable along a first axis 80 in the chamber 20. The track 76 also allows the mount 70 to move along the second axis 82 perpendicular to the first axis 80.

In another embodiment, the inventors have discovered that by varying the position of a single point pyrometer it is possible to improve the thermal profile. For example, during use of the SLS machine for a certain build or with a certain powder, the operators may identify one or two critical zones where temperature issues are known to occur. The present invention uses a mount for the pyrometer that is selectively adjustable along axes to enable the operator to selectively measure the temperature at different areas on the working layer using the single point pyrometer. In one embodiment, the pyrometer is fixed on adjustable track that allows for selective movement along a first axis. In another embodiment, the track enables movement along a first axis and along a second axis. The operator can selectively position the pyrometer prior to a build and then lock the pyrometer into position during the high temperature building process to monitor the temperature at an area of interest.

Figure 3:
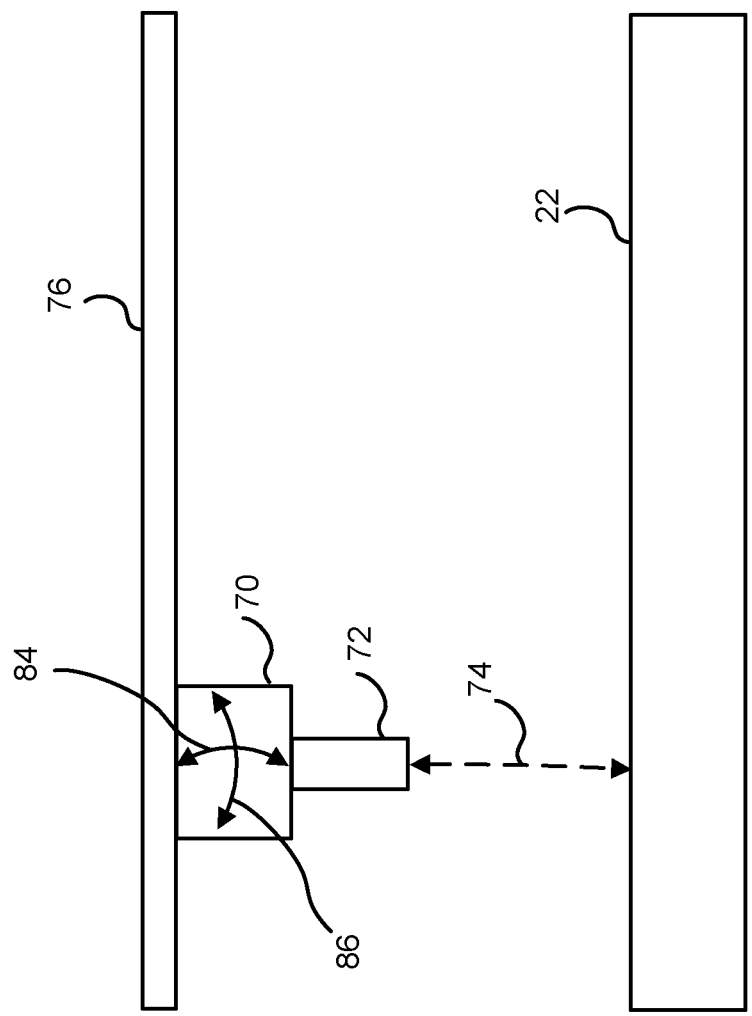
FIG. 3 is a schematic view of a mount and temperature sensor in accordance with one embodiment of the present invention.

FIG. 3 shows a schematic view of the mount 70 and temperature sensor 72 from FIG. 1. A mount 70 and temperature sensor 72 are disposed above the bed 22. The temperature sensor 72 transmits a beam 74 to monitor a temperature at a select point on the bed 22. The temperature sensor 72 is connected to a mount 70.

For example, the mount 70 is coupled to a track 76, which allows the mount 70 to rotate along the first axis of rotation 84. The track 76 also allows the mount 70 to rotate along the second axis of rotation 86.

In another embodiment of the present invention, the movement of the mount 70 is automatic. For example, motors are disposed above the bed surface 22 coupled with the track 76 and mount 70 to enable adjustments of the temperature sensor 72 position during the build run. This allows the operator to measure various points of the bed surface 22 during the build run without stopping the machine to adjust the position of the temperature sensor 72 and potentially ruining the build 28.

In one embodiment of the present invention, a fixed-point pyrometer is mounted on spherical mount that is selectively lockable. In this manner, it is possible to adjust the direction and angle of the pyrometer to areas of interest in the working layer, while offsetting the pyrometer and the supporting mount so as the avoid interference with the laser scanner. In yet other embodiments, mounts being lockable and having different freedom of movement can be used to selectively position the pyrometer. In some embodiments, the mount includes one or more sensors so as to provide the controller with an indication of the point on the working layer where the temperature is being measured. It should be understood to a person having ordinary skill in the art that such communication capabilities are not required to practice the present mention. In some in some embodiments, the focal length of the pyrometer is adjustable so as to further enhance detection of temperature at a select point.

Figure 4:
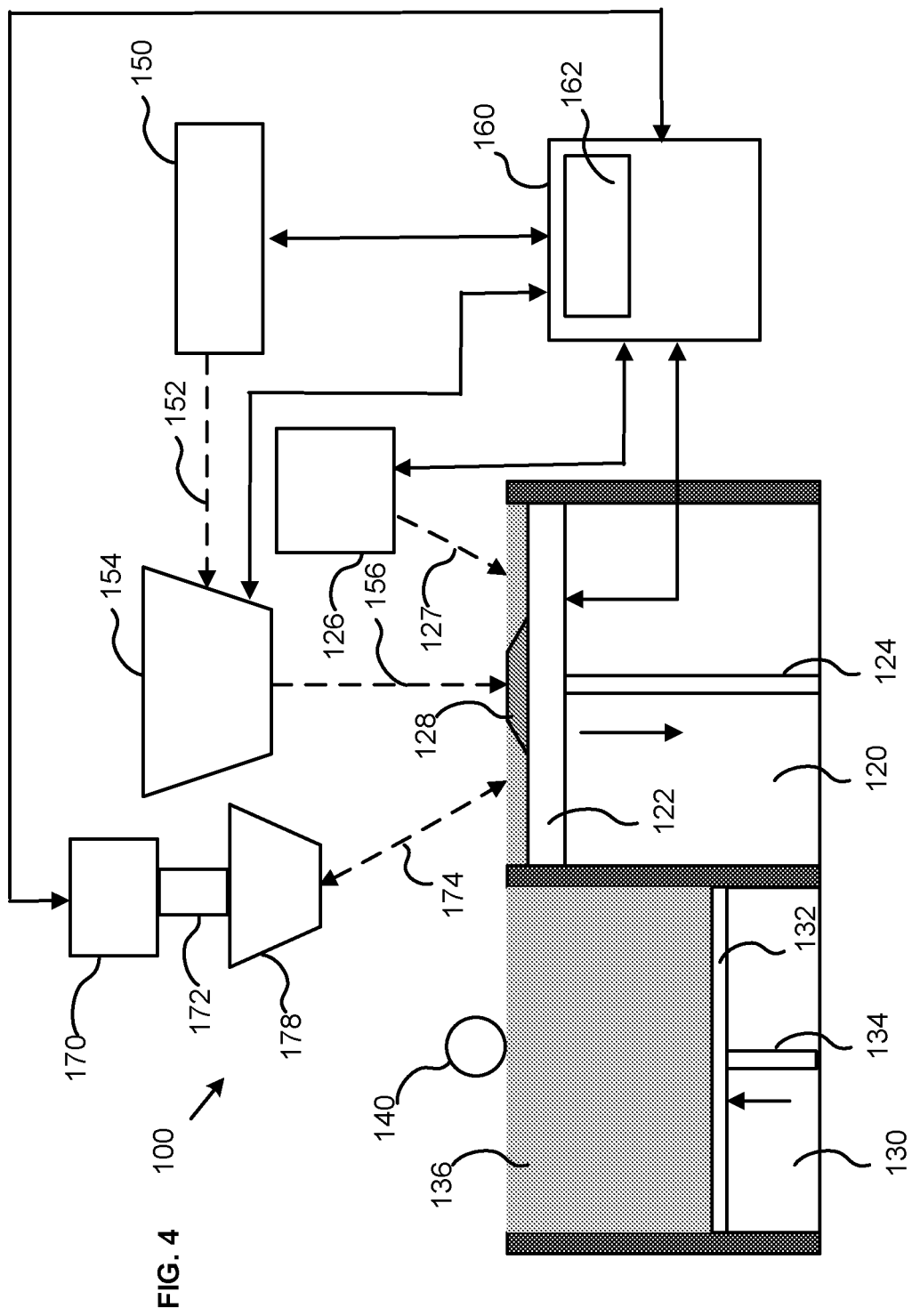
FIG. 4 illustrates an LS machine in accordance with one embodiment of the present invention.

In reference to FIG. 4, an LS system 100 in accordance with another embodiment of the present invention is illustrated. The system 100 includes a first chamber 120 having an actuatable piston 124 disposed therein. A bed 122 is disposed at an end of the piston 124. It should be understood that the term bed may refer to the physical structure supported on the piston or the uppermost layer of powder disposed thereon.

The temperature of the bed 122 can be variably controlled via a controller 60 in communication with one or more heating elements in and or around the bed 122. Furthermore, the LS system 100 according to the invention includes a heating device 126 above the bed 122, which preheats a newly applied powder layer up to a working temperature below a temperature at which the solidification of the powder material occurs. The heating device 126 may be a radiative heating device (e.g., one or more radiant heaters) which can introduce heat energy into the newly applied powder layer in a large area by emitting electromagnetic radiation and is in communication with controller 160. It will be understood to a person of ordinary skill in the art and familiar with this disclosure that multiple radiative heating units may be used in the practice of the present invention.

A second chamber 130 is adjacent to the first chamber 120. The second chamber 130 includes a table surface 132 disposed on an end of a piston 134 disposed therein. A powder 36 for use in the LS system 100 is stored in the second chamber 130 prior to the sintering step. It will be understood to a person of ordinary skill in the art and familiar with this disclosure that while a specific embodiment of an LS system is disclosed, the present invention is not limited and different known LS systems may be employed in the practice of the present invention.

During operation of the LS system 100, a spreader 140 translates across a top surface of the first chamber 120, evenly distributing a layer of powder 136 across either the top surface of the bed 122, or the material previously disposed on the bed 122. The LS system 100 preheats the powder material 136 disposed on the bed 122 to a temperature proximate to a melting point of the powder. Typically, a layer of powder is spread to have a thickness of 125 μm, however the thickness of the layer of powder can be increased or decreased depending on the specific LS process and within the limits of the LS system.

A laser 150 and a scanning device 154 are disposed above the bed 122. The laser 150 transmits a beam 152 to the scanner 154, which then distributes a laser beam 156 across the layer of powder 136 disposed on the bed 122 in accordance with a build data. The laser 150 selectively fuses powdered material by scanning cross-sections generated from a three-dimensional digital description of the part on the surface of the bed 122 having a layer of the powdered material disposed thereon. The laser 150 and the scanner 154 are in communication with the controller 160. After a cross-section is scanned, the bed 122 is lowered by one layer thickness (illustrated by the downward arrow), a new layer of powdered material is disposed on the bed 122 via the spreader 140, and the bed 122 is rescanned by the laser 150. This process is repeated until a build 128 is completed. During this process, the piston 134 in the second chamber is incrementally raised (illustrated by the upward arrow) to ensure that there is a sufficient supply of powder 136.

In further reference to FIG. 4, a mount 170 and temperature sensor 172 are disposed above the bed 122. The temperature sensor 172 is coupled to the mount 170. The temperature sensor 172 is configured to detect the temperature of a point on the bed surface 122. The temperature sensor 172 reflects a beam 174 through a scanner 178 off the bed surface 122 and relays it back to the controller 160 to monitor the temperature at a select point on the bed 122.

The temperature sensor 172 is connected to a mount 170 which is biasable between fixed and unfixed positions. The temperature sensor 172 is coupled to a scanner 178 that sweeps the bed 122 to determine the bed temperature at different areas. The temperature sensor 172 is in communication with the controller 160.

The scanner 178 is connected to the mount 170 to scan the bed surface 122 at the same time the temperature sensor 172 is measuring the temperature of the bed surface 122. The scanner 178 sweeps the bed surface 122 in a specific pattern to increase the area of thermal recognition. This increased area allows the software in the controller 160 to create a thermal map of the bed surface 122. The thermal map then can be used by the operator to better maintain a uniform bed surface temperature throughout the build run.

In another embodiment of the present invention, the control system may be used to calibrate the heaters and confirm a heater is operating within its specified parameters. Specifically, by using software executing on the control system to compare the thermal map of the working layer it is possible to adjust the input to the heaters and different segments thereof to achieve a uniform temperature distribution.

In another embodiment of the present system, a pyrometer is optically coupled to an optical scanner that sweeps the bed to determine the bed temperature at different areas. In this manner, it is possible to develop and store a thermal map of the working layer. The scanning sweeps the bed in a loose pattern to increase the area of thermal recognition. Thermal data received from the pyrometer is transmitted to the controller where it can be used to create a dynamic thermal map of the working bed. Software executing on the control system uses the thermal map to better control and vary the heat input into the system so as to achieve a working surface having a more uniform temperature. The more uniform temperature results in more linear shrinkage profile across the system that is easier to model and results in increased structural performance of parts manufactured using this process. Although it is possible to obtain high resolution thermal mapping data in this manner, it is not necessary to obtain high resolution thermal data of the working layer to improve thermal control in the system.

Figure 5:
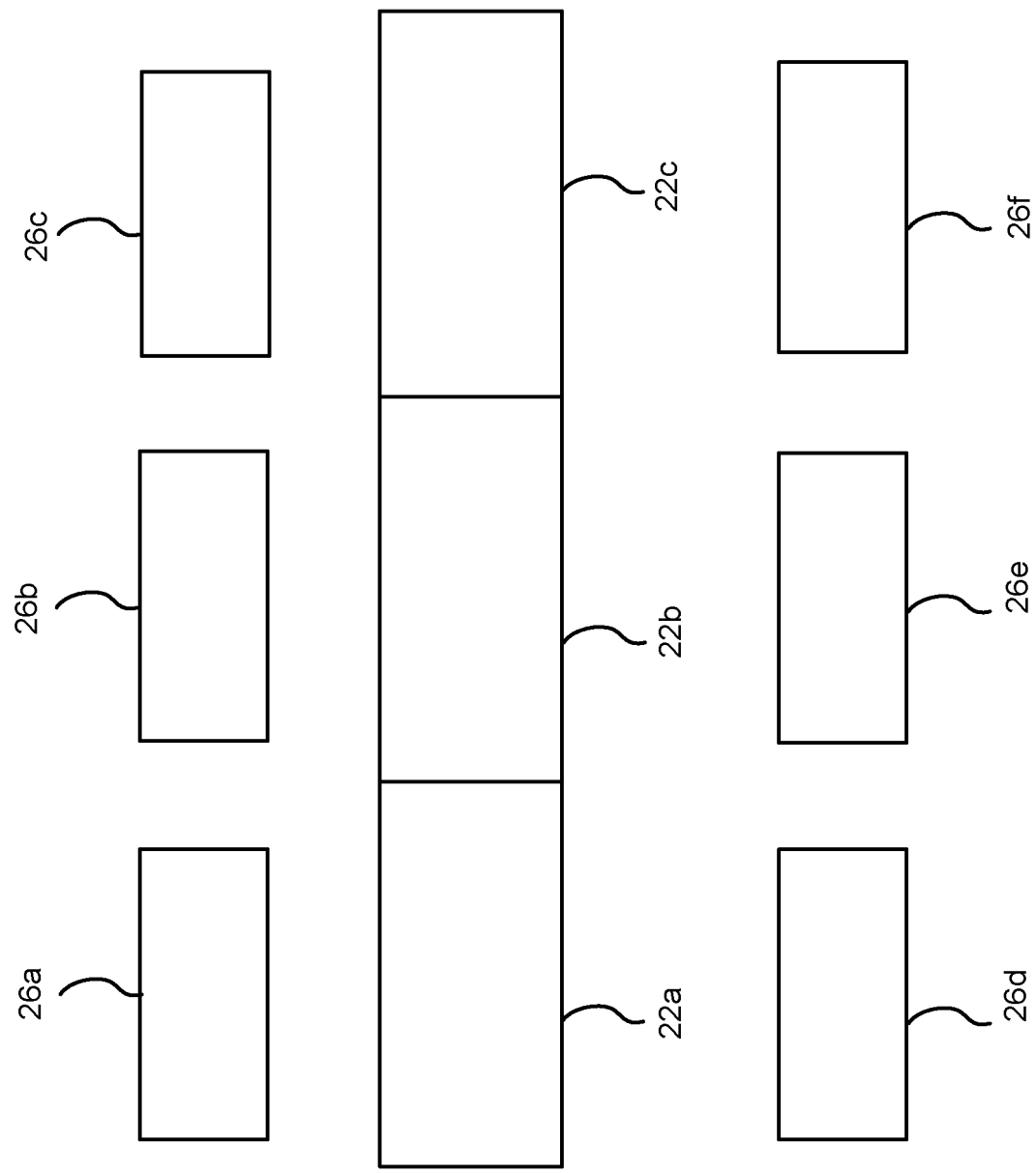
FIG. 5 illustrates a system of bed heaters in accordance with one embodiment of the present invention.

FIG. 5 shows one embodiment of the system with multiple heaters and multiple zones on the bed. The first heater 26a and fourth heater 26d heat the first zone 22a, the second heater 26b and fifth heater 26e heat the second zone 22b, and the third heater 26c and sixth heater 26f heat the third zone 22c. This allows for an even temperature throughout the bed 22 and better control of the bed 22. The heaters 26(a-f) can all be controlled by the controller 60 and can be placed at different angles and areas in the chamber 20 above the bed 22.

In one embodiment, segmented linear heaters are used to enable independent variable adjustment of the thermal heating profile along the length of the heater. In this embodiment, the one or more heaters are connected to the control system. A control regime is implemented wherein software executing on the controller variably and independently adjusts the segmented heaters and portions thereof achieve a uniform temperature at the working layer. In other embodiments of the present invention, the radiator heaters are adjustable mounted in the above the working area. Prior to or during a build process, the position of the heating relative to the working layer can be adjusted to achieve a desired thermal profile on the bed as determined by the thermal map. Another embodiment for heating control involves managing the radiant energy by the use of adjustable fins, baffles, reflectors, screens or filters to provide fine control.

A known drawback of LS of polymers is that constructed parts exhibit diminished mechanical properties relative to extruded or molded parts made from an identical material. This is especially true with high temperature LS performed with PAEK polymers. For example, a recent paper High Temperature Laser Sintering: An investigation into mechanical properties and shrinkage characteristics of Poly (Ether) Ketone structures presented an investigation into the properties of PEK components using the EOSINT P800. The shrinkage and the mechanical performance of components across the entire build chamber were tested and non-linear shrinkage profiles were obtained. The middle of the build chamber recorded the highest degree of shrinkage and the shrinkage in Z direction had the largest variation. The laser sintered components built in X and Y directions recorded a 10% lower tensile strength than the injection molded samples of the same material where those built in the Z direction showed an approximately 50% decrease in strength in comparison with the injection molded test specimens. The crystallinity between the surface and the middle of the sintered samples was different; varied with the position within the build chamber and coincided with noticeable sample color changes.

Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments. Many different building materials may be used with the present invention, including but not limited to, polyaryletherketone, polyarylethersulfone, polyamide, polyester, polyether, polyolefin, polystyrene, polyphenylenesulfide, polyvinyildenfluoride, polyphenyleneoxyde, polyimide, their copolymers and blends which include at least one of the preceding polymers; however the selection is not restricted to the above-mentioned polymer and copolymer. Polyaryletherketone, which are particularly suitable, can be selected from the group of polyetheretherketone (PEEK), polyetherketoneketone (PEKK), polyetherketone (PEK), polyetheretherketoneeketone (PEEKK) and polyetherketoneetherketoneeketone (PEKEKK) and polyetheretheretherketone (PEEEK) as well as their copolymers, in particular with polyarylethersulfone as well as their blends thereof can be selected which includes at least one of the above-mentioned polymers. Polyamide-polymer or copolymer and the blends thereof, which are particularly suitable, can be selected from the group which consists of polyamide 6/6T, polyamideelastomer such as polyetherblockamide such as PEBAX-based materials, polyamide 6, polyamide 66, polyamide 11, polyamide 12, polyamide 612, polyamide 610, polyamide 1010, polyamide 1212, polyamide PA6T/66, PA4T/46, PA9T and copolymers which include at least one of the above-mentioned polymers. Suitable polyester polymer or copolymer can be selected from polyalkylentererephtholate (for example PET, PBT)

and their copolymers. Suitable polyolefinpolymer or copolymer can be selected from a group of consisting of polyethylene and polypropylene. Suitable polystyrene polymer or copolymer can be selected from a group consisting of syndiotactic and isotactic polysterene. Further, compound powder of polymer can be used which include fillers and/or additives in addition to the corresponding polymer, copolymer or blend. Such fillers are for example fibers, such as carbon or glass-fibers and nano-tubes, fillers having a low aspect ratio such as glass-beads or aluminum grains, mineral fillers, such as titanium dioxide. The additives can be, amongst others, process assisting means such as ripple-assisting means of the aerosol-series (such as Aerosil 200), functional additives such as heat stabilisators, oxidation stabilisators, color pigments (such as graphite and soot) and fire-proof means (such as organophosphate, polybromineated hydrocarbon). As powdery material 11, also metals, ceramics, molding sand and compound materials can be used. As metal-containing powdery material, arbitrary metals and their alloys as well as mixtures of metallic components or non-metallic components can be considered.

The present invention is especially useful for LS with polymer powders. One such class of polymer powders is Polyaryletherketones ("PAEK") polymers. PAEKs are of interest in the LS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKKs are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

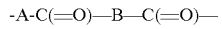  I

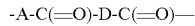  II where A is a p,p'-Ph-O-Ph-group, Ph is a phenylene radical, B is p-phenylene, and D is m-phenylene. The Formula I:Formula II isomer ratio, commonly referred to as the T:I ratio, in the PEKK is selected so as to vary the total crystallinity of the polymer. The T:I ratio is commonly varied from 50:50 to 90:10, and in some embodiments 60:40 to 80:20. A higher T:I ratio such as, 80:20, provides a higher degree of crystallinity as compared to a lower T:I ratio, such as 60:40.

The crystal structure, polymorphism and morphology of homopolymers of PEKK have been studied and have been reported in, for example, Cheng, Z. D. et al, "Polymorphism and crystal structure identification in poly(aryl ether ketone ketone)s," Macromol. Chem. Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)] or alternating T and I isomers [PEKK(T/I)]. PEKK(T) and PEKK(T/I) show crystalline polymorphism depending upon the crystallization conditions and methods.

In PEKK(T), two crystalline forms, forms I and II, are observed. Form I can be produced when samples are crystallized from melting at low supercoolings, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a form III.

Suitable PEKKs are available from several commercial sources under various brand names. For example, polyetherketoneketones are sold under the brand name OXPEKK® polymers by Oxford Performance Materials, South Windsor, Conn., including OXPEKK®-C, OXPEKK®-CE, OXPEKK®-D and OXPEKK®-SP, OXPEKK®-N, OXPEKK®-ESD polymers. Polyetherketoneketone polymers are also manufactured and supplied by Arkema. In addition to using polymers with a specific T:I ratio, mixtures of polyetherketoneketones may be employed.

The powders used in these applications are produced by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated to not significantly reduce the melting temperature or the quantity of the crystallinity formed in the heat treatment process.

Although the present disclosure is provided in reference to PAEK polymers, and more specifically PEKK polymers, the present disclosure is not so limited. A person of ordinary skill in the art and familiar with this disclosure would understand that the present invention may be employed with other types of polymers useful in LS and with other materials useful in LS, including, but not limited to, metals and ceramics.

In the LS process the temperature of the working layer is important in determining the effectiveness of the build process and maintaining strength in the manufactured part, particularly along the z-axis. For example, from U.S. Patent Publication No. 2015/0061195 for a Method for Analytically Determining SLS Bed Temperatures to Oxford Performance Materials, Inc., a bed temperature is typically set several degrees Celsius below the temperature at which the powder begins to fuse. The bed temperature may also be determined by an analytical method. That disclosure is incorporated by reference herein. It will be understood to a person of ordinary skill in the art and familiar with these references that the bed temperature is referring to the working layer. This is the layer in the build process that has been most recently applied and is subject to laser sintering.

It should be apparent from the foregoing detailed description that the objects set forth hereinabove have been successfully achieved. Moreover, while there is shown and described present embodiments of the invention it is to be understood that the invention is not limited thereto but may otherwise variously embodied and practiced within the scope of the following claims. That is, while the present teachings have been described above in terms of specific embodiments. Many modifications and other embodiments will come to mind to those skilled in the art to which this pertains, and which are intended to be and are covered by both this disclosure and the appended claims. It is intended that the scope of the present teachings should be determined by proper interpretations and construction of the appended claims and their legal equivalents, as understood by those of skill in the art relying upon the disclosure in this specification and the attached drawings.

What is claimed is:

1. A system for producing an object from a powder, comprising:
    a housing defining a chamber;
        a support platform disposed in the chamber and moveable therein along an axis for supporting one or more layers of a powder and any part formed therein;
        a spreader for applying a layer of powder to a bed surface defined by an upper surface of the support platform or an upper surface of the powdered layer prepared most recently on the support platform;
        an irradiation source for irradiating select points in the powdered layer prepared most recently on the support platform;
        a radiant heater disposed in the chamber and configured to heat at least a portion of the bed surface;
        a temperature sensor disposed in the chamber and configured to monitor a temperature at a select point on the bed surface, the temperature sensor connected to a mount disposed in the chamber, the mount being manually biasable between a first configuration and a second configuration wherein in the first configuration the mount is locked and the position of the temperature sensor relative to the bed surface is fixed and in the second configuration the mount is unlocked and the position of the temperature sensor relative to the bed surface is manually adjustable; the mount includes one or more sensors so as to provide the controller with an indication of the point on the working layer where the temperature is being measured, and
        a controller for adjusting the radiant heater in response to temperature data provided by the temperature sensor;
    wherein the mount enables an operator to manually adjust and a set a position of the temperature sensor relative to the bed surface prior to a build run in the chamber so that the temperature sensor can monitor a select point of the bed surface desired by the operator.

2. The system of claim 1 wherein the temperature sensor is a pyrometer.

3. The system of claim 2 wherein the mount is translatable along a first axis in the chamber when the mount is in the second configuration.

4. The system of claim 3 wherein the first axis is parallel to the bed surface.

5. The system of claim 4 wherein the mount is translatable along a second axis perpendicular to the first axis when the mount is in the second configuration.

6. The system of claim 2 wherein the mount is rotatable about a first axis of rotation when the mount is in the second configuration.

7. The system of claim 6 wherein the mount is rotatable about a second axis of rotation when the mount is in the second configuration.

8. The system of claim 7 wherein the mount comprises a spherical mount to rotate about the first axis of rotation and rotate about the second axis of rotation, the spherical mount defining a convex arcuate surface and a concave arcuate surface for facilitating rotation when the mount is in the second configuration.

9. The system of claim 8 wherein the mount is positioned vertically above the bed and horizontally outside a two-dimension perimeter of the bed defined by a top surface thereof so that a reading from a temperature sensor connected to the mount and projected vertically downward with no horizontal element would not read a temperature on the surface of the bed.

10. A system for producing an object from a powder, comprising:
    a housing defining a chamber;
        a support platform disposed in the chamber and moveable therein along an axis for supporting one or more layers of a powder and any part formed therein;
        a spreader for applying a layer of powder to a bed surface, defined by an upper surface of the support platform or an upper surface of the powdered layer prepared most recently on the support platform;
        an irradiation source for irradiating select points in the powdered layer prepared most recently on the support platform;
        a radiant heater disposed in the chamber and configured to heat at least a portion of the bed surface;
        a temperature sensor disposed in the chamber and configured to monitor the temperature of a plurality of positions on the bed surface during a build process, the temperature sensor connected to a mount disposed in the chamber, the mount being manually biasable between a first configuration and a second configuration wherein in the first configuration the mount is locked and the position of the temperature sensor relative to the bed surface is fixed and in the second configuration the mount is unlocked and the position of the temperature sensor relative to the bed surface is manually adjustable; and
        a controller for adjusting the radiant heater in response to temperature data provided by the temperature sensor.

11. The system of claim 10 wherein the radiant heater comprises a plurality of radiant heaters.

12. The system of claim 11 wherein the controller adjusts the radiant heater to maintain a first temperature at a first temperature zone on the bed surface and to maintain a second temperature at a second temperature zone on the bed surface.

13. The system of claim 11 wherein the temperature sensor is a pyrometer.

14. The system of claim 13 wherein the pyrometer is in optic communication with a scanner that is configured to sweep the bed surface.

15. The system of claim 14 wherein the scanner sweeps the bed in a pattern to increase an area of thermal recognition.

16. The system of claim 15 wherein thermal data is received from the pyrometer and transmitted to the controller to create a thermal map of at least an area of the bed surface.

17. The system of claim 16 wherein the controller adjusts the radiant heater based on the radiant heater to control the temperature of the bed surface.

18. The system of claim 10 wherein the mount is rotatable about a first axis of rotation when the mount is in the second configuration;
    wherein the mount is rotatable about a second axis of rotation when the mount is in the second configuration.

19. The system of claim 18 wherein the mount comprises a spherical mount to rotate about the first axis of rotation and rotate about the second axis of rotation, the spherical mount defining a convex arcuate surface and a concave arcuate surface for facilitating rotation when the mount is in the second configuration.

20. The system of claim 19 wherein the mount is positioned vertically above the bed and horizontally outside a two-dimension perimeter of the bed defined by a top surface thereof so that a reading from a temperature sensor connected to the mount and projected vertically downward with no horizontal element would not read a temperature on the surface of the bed.

\* \* \* \* \*